United States Patent [19]

Suzuki et al.

[11] Patent Number: 4,987,045
[45] Date of Patent: Jan. 22, 1991

[54] PHOTOSENSITIVE MEMBER FOR ELECTROPHOTOGRAPHY

[75] Inventors: Tetsumi Suzuki, Isehara; Tetsuo Murayama, Machida; Hitoshi Ono, Yokohama; Osamu Ando, Kawasaki, all of Japan

[73] Assignee: Mitsubishi Kasei Corporation, Tokyo, Japan

[21] Appl. No.: 420,684

[22] Filed: Oct. 11, 1989

Related U.S. Application Data

[63] Continuation of Ser. No. 307,159, Feb. 6, 1989, abandoned, which is a continuation of Ser. No. 111,913, Oct. 21, 1987, abandoned, which is a continuation of Ser. No. 920,507, Oct. 17, 1986, abandoned.

[30] Foreign Application Priority Data

Oct. 23, 1985 [JP] Japan .................... 60-236935

[51] Int. Cl.$^5$ ............................ G03G 5/14
[52] U.S. Cl. .................................... 430/59
[58] Field of Search ........................ 430/58, 59

[56] References Cited

U.S. PATENT DOCUMENTS 4,410,615 10/1983 Goto et al. ................ 430/59
4,666,809 5/1987 Matsumoto et al. ........ 430/76

*Primary Examiner*—David Welsh
*Attorney, Agent, or Firm*—Ernest V. Linek; David G. Conlin

[57] ABSTRACT

A photosensitive member for electrophotography having a photosensitive layer containing a hydrazone compound represented by the following general formula [I]:

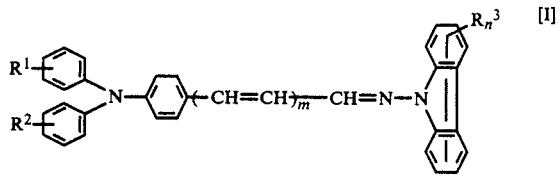

wherein $R^1$ and $R^2$ independently represent a hydrogen atom, an alkyl group, an alkoxy group or a halogen atom; $R^3$ represents a halogen atom; m is 1 or 2; and n is 0, 1 or 2. The photosensitive member has not only extremely high sensitivity but also sufficiently low residual potential. It is also highly resistant to fatigue so that the repeated use provides it with little accumulation of residual potential and little variation of surface potential and sensitivity.

6 Claims, 2 Drawing Sheets

PHOTOSENSITIVE MEMBER FOR ELECTROPHOTOGRAPHY

This is a continuation of copending application Ser. No. 07/307,159 filed on Feb. 6, 1989, which is a continuation of co-pending application Ser. No. 07/111,913 filed on Oct. 21, 1987, which is a continuation of co-pending application Ser. No. 920,507 filed on Oct. 17, 1986 now all abandoned.

BACKGROUND OF THE INVENTION

The present invention relates to a photosensitive member for electrophotography, and more particularly to a high-sensitivity photosensitive member for electrophotography having a photosensitive layer containing an organic photoconductive material.

The photosensitive layers of photosensitive members for electrophotography were conventionally made from inorganic photoconductive materials such as selenium, cadmium sulfide, zinc oxide, etc. However, selenium not only needs to be recovered as a toxic material but also has poor heat resistance because it is crystallized by heat. Cadmium sulfide also needs to be recovered as a toxic material and has poor humidity resistance. As for zinc oxide, it has poor humidity resistance and insufficient durability for repeated copying. Thus, efforts have been made to develop new photosensitive members.

Recently, research has been advanced on organic photoconductive materials for use in the photosensitive layers of electrophotographic photosensitive members, and some of them have been put into practical use. The organic photoconductive materials are superior to the inorganic counterparts in that the former is lighter, easier to form into films, easier to manufacture photosensitive members and even capable of providing transparent photosensitive members depending on the types thereof.

Despite these advantages, the organic photoconductive materials have not been widely used for photosensitive members for electrophotography, because they are inferior to the inorganic counterparts with respect to sensitivity and durability.

What has recently become a main stream of development is a so-called separated function-type photosensitive member in which different compounds separately bear the functions of generating and transporting charge carriers, since such function separation is highly effective for increasing sensitivity. This type of the organic photosensitive members have also been put into practical use.

Useful as charge carrier-transporting media are high-molecular, photoconductive compounds such as polyvinyl carbazole, and low-molecular, photoconductive compounds dispersed in polymer binders.

As for organic, low-molecular, photoconductive compounds, they can easily provide photosensitive members having excellent mechanical properties because their binders can be selected from polymers having good film-forming properties, flexibility and adhesion. Nevertheless, it was difficult to find out compounds suitable for producing photosensitive members with sufficiently high sensitivity.

OBJECT AND SUMMARY OF THE INVENTION

An object of the present invention is, therefore, to provide an organic photosensitive member for electrophotography having high sensitivity and durability.

As a result of intense research in view of the above object, it has been found that a particular hydrazone compound can be suitably used as an organic, low-molecular, photoconductive compound for providing photosensitive members for electrophotography having high sensitivity and durability. The present invention is based on this finding.

That is, the photosensitive member for electrophotography according to the present invention has a photosensitive layer containing a hydrazone compound having the following general formula [I]:

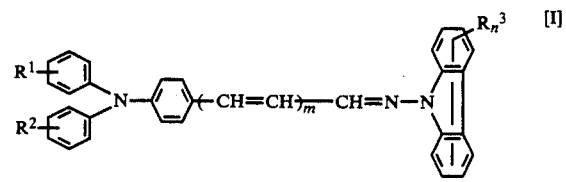

wherein $R^1$ and $R^2$ independently represent a hydrogen atom, an alkyl group, an alkoxy group or a halogen atom; $R^3$ represents a halogen atom; m is 1 or 2; and n is 0, 1 or 2.

DETAILED DESCRIPTION OF THE INVENTION

Figure 1:
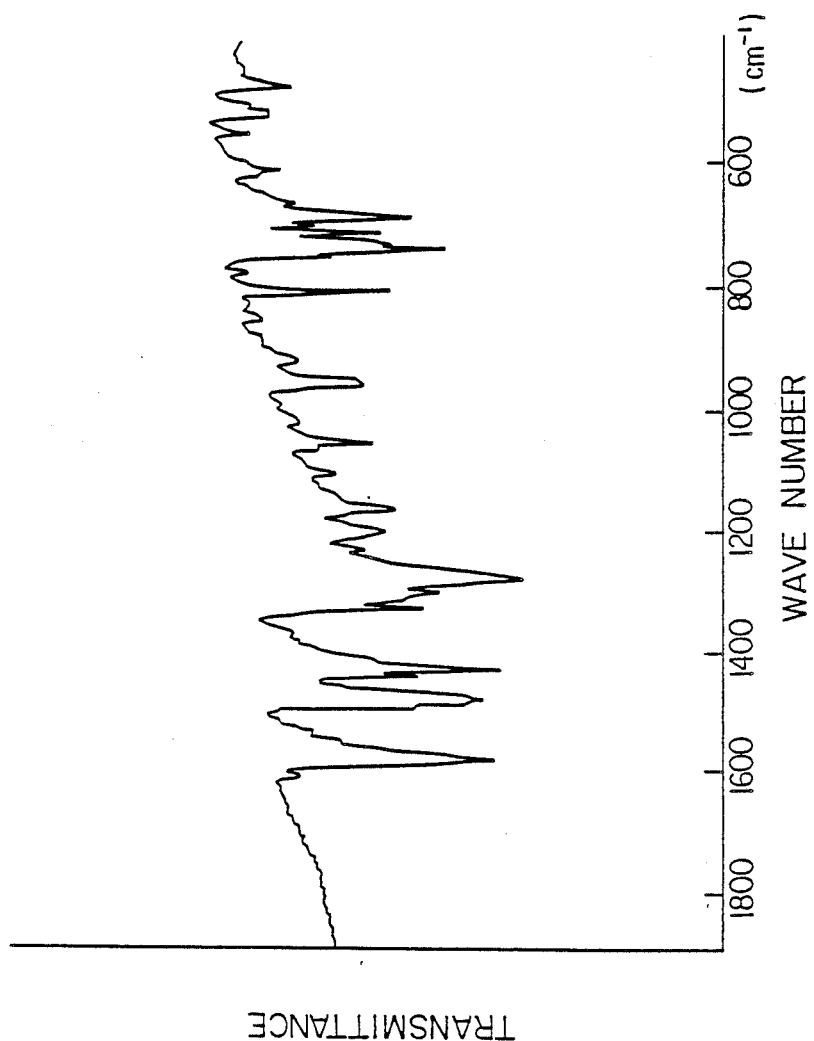
FIG. 1 is a graph showing an infrared spectrum of the hydrazone compound of the present invention synthesized in Reference Example 1.

In the hydrazone compound of the present invention by the general formula [I], $R^1$ and $R^2$ independently represent a hydrogen atom; an alkyl group such as methyl and ethyl; an alkoxy group such as methoxy and ethoxy; and a halogen atom such as bromine and chlorine. And $R^3$ represents a halogen atom such as bromine and chlorine; m represents 1 or 2; and n represents 0, 1 or 2.

The hydrazone compound represented by the above general formula [I] may be manufactured by known methods. A typical example of such known methods comprises reacting aldehyde represented by the following general formula [II]:

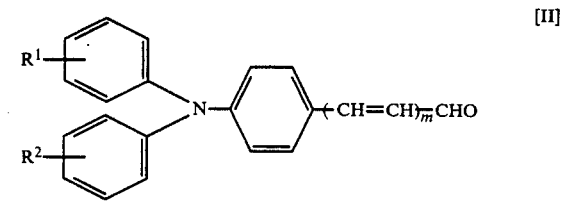

wherein $R^1$, $R^2$ and m are the same as defined above in connection with the general formula [I] with hydrazine represented by the following general formula:

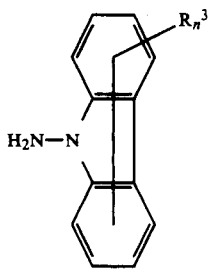

$$[III]$$

wherein $R^3$ and n are the same as defined above in connection with the general formula [I], or its hydrochloride or sulfate in an inert solvent at temperatures of 10°–200° C., preferably 20°–100° C. The above inert solvent may be selected from aromatic hydrocarbons such as benzene, toluene and chlorobenzene; alcohols such as methanol, ethanol and butanol; ethers such as tetrahydrofuran, 1,2-dimethoxy ethane and 1,4-dioxane; cellosolves such as methyl cellosolve and ethyl cellosolve; N,N-dimethyl formamide, dimethyl sulfoxide, N-methyl pyrrolidone, etc. In order to accelerate the reaction, p-toluene sulfonic acid, benzene sulfonic acid, hydrochloric acid, sulfuric acid, potassium acetate, sodium acetate, etc. may be added to the reaction mixture.

The photosensitive member for electrophotography according to the present invention has a photosensitive layer containing one or more of the hydrazone compounds represented by the above general formula [I]. The hydrazone compounds of the general formula [I] have excellent properties as organic photosemiconductors. Particularly when they are used as charge carrier transport media, the resulting photosensitive members have high sensitivity and durability.

The photosensitive member for electrophotography according to the present invention may have a photosensitive layer of any known type. For instance, it may be:

(a) a photosensitive layer comprising the hydrazone compound, a binder and if necessary, a dyestuff and an electron-attracting compound, or acceptor which serve as sensitizers;

(b) a photosensitive layer comprising the hydrazone compound, photoconductive particles generating charge carriers with extremely high efficiency upon absorption of light, and a binder; and (c) a photosensitive laminate layer having a charge carrier transport layer comprising the hydrazone compound and a binder, and a charge carrier generating layer comprising photoconductive particles generating charge carriers with extremely high efficiency upon absorption of light with or without a binder. The charge carrier generating layer usually has a thickness of from 0.01 to 2 μm, and the charge carrier transport layer usually has a thickness of from 5 to 50 μm.

Particularly when the hydrazone compound of the general formula [I] is used in the charge carrier transport layer of the photosensitive layer (c) comprising the charge carrier generating layer and the charge carrier transport layer, the resulting photosensitive member has remarkably high sensitivity and sufficiently low residual potential, and is highly durable as evidenced from the fact that it undergoes little variation of surface potential, little decrease in sensitivity and little accumulation of residual potential even after the repeated use thereof.

Incidentally, the above photosensitive layers (a)–(c) may contain, in addition to the hydrazone compounds represented by the general formula [I], known hydrazone compounds having good properties as organic photosemiconductors.

The photosensitive layer in the photosensitive member for electrophotography according to the present invention may be prepared by commonly known procedures, namely by dissolving the hydrazone compound of the general formula [I] together with a binder in an appropriate solvent, adding to the mixture photoconductive particles generating charge carriers with extremely high efficiency upon absorption of light, dyestuffs and electron-attracting compounds serving as sensitizers, plasticizers, pigments and other additives depending on necessity to form a coating fluid, and applying it to a conductive substrate in a dry film thickness of several microns to several tens microns. When the photosensitive layer is composed of the charge carrier generating layer and the charge carrier transport layer, it may be formed by applying the above coating fluid onto the charge carrier generating layer, or by forming the charge carrier generating layer on the charge carrier transport layer made from the above coating fluid.

The solvents which may be used for preparing the coating fluid include ethers such as tetrahydrofuran and 1,4-dioxane; ketones such as methyl ethyl ketone and cyclohexanone; aromatic hydrocarbons such as toluene and xylene; aprotic polar solvents such as N,N-dimethyl formamide, acetonitrile, N-methyl pyrrolidone and dimethyl sulfoxide; esters such as ethyl acetate, methyl formate and methyl cellosolve acetate; and chlorinated hydrocarbons such as dichloroethane and chloroform, which are capable of dissolving the hydrazone compounds of the general formula [I]. Needless to say, the selection of solvents should be made keeping in mind that binders to be used should also be dissolved.

Usable a the binders are various polymers compatible with the hydrazone compounds represented by the general formula [I]. Such binders include polymers and copolymers of vinyl compounds such as styrene, vinyl acetate, vinyl chloride, acrylates, methacrylates and butadiene, polyvinyl acetals, polycarbonates, polyesters, polysulfones, polyphenylene oxides, polyurethanes, cellulose esters, cellulose ethers, phenoxy resins, silicone resins, and epoxy resins. The binder is used in the photosensitive layer usually in an amount of 0.5–30 times, preferably 0.7–10 times the hydrazone compound on a weight basis.

With respect to photoconductive particles, dyes and electron-attracting compounds to be added to the photosensitive layer, well known compounds may be used.

The photoconductive particles generating charge carriers with extremely high efficiency upon absorption of light may be inorganic, photoconductive particles of selenium, a selenium-tellurium alloy, a selenium-arsenic alloy, cadmium sulfide, amorphous silicon, etc.; and organic, photoconductive particles of copper phthalocyanine, perinone pigments, thioindigo, quinacridone pigments, perylene pigments, anthraquinone pigments, azo pigments, bisazo pigments, cyanine pigments, etc. The photoconductive particles have a particle size of up to 5 μm, preferably up to 3 μm, most preferably up to 1 μm.

The dyes which may be contained as sensitizers include triphenylmethane dyes such as Methyl Violet, Brilliant Green, Crystal Violet; thiazine dyes such as Methylene Blue; quinone dyes such as Quinizaline; cyanine dyes as well as pyrylium salts, thiapyrylium salts, benzopyrylium salts, etc.

The electron-attracting compounds which are combined with the hydrazone compounds to form charge-transfer complexes are, for instance, quinones such as chloranil, 2,3-dichloro1,4-naphthoquinone, 1-nitroanthraquinone, 1-chloro-5-nitroanthraquinone, 2-chloroanthraquinone, phenanthrenequinone, etc.; aldehydes such as 4-nitrobenzaldehyde, etc.; ketones such as 9-benzoylanthracene, indanedione, 3,5-dinitrobenzophenone, 2,4,7-trinitrofluorenone, 2,4,5,7-tetranitrofluorenone, 3,3',5,5'-tetranitrobenzophenone, etc.; acid anhydrides such as phthalic anhydride, 4-chloronaphthalic anhydride, etc.; cyano compounds such as tetracyanoethylene, terephthalalmalononitrile, 9-anthrylmethylidenemalononitrile, 4-nitrobenzalmalononitrile, 4-(p-nitrobenzoyloxy)benzalmalononitrile, etc.; phthalides such as 3-benzalphthalide, 3-(α-cyano-p-nitrobenzal)phthalide, 3-(α-cyano-p-nitrobenzal)-4,5,6,7-tetrachlorophthalide, etc.

Further, the photosensitive layer of the photosensitive member for electrophotography according to the present invention may contain a plasticizer to improve film-forming properties, flexibility and mechanical strength thereof. The plasticizers which may be added to the coating fluid for the above purposes include organic compounds such as phthalic esters, phosphate esters, epoxy compounds, chlorinated paraffins, chlorinated fatty esters, methylnaphthalene, etc.

When the hydrazone compound is used as a charge carrier transport medium in the charge carrier transport layer, the coating fluid for such layer needs only contain small amounts of the photoconductive particles, the dyes and the electron-attracting compounds, if any. In this case, the charge carrier generating layer may be a thin layer prepared by applying a coating fluid containing the above photoconductive particles and if necessary, a polymer binder, an organic photoconductive material, a dye and an electronattracting compound dissolved or dispersed in a solvent and drying it, or a thin layer prepared by vapor deposition of the above photoconductive particle materials.

The photosensitive member thus formed may also comprise a bonding layer, an intermediate layer and a transparent insulating layer. A conductive substrate on which the photosensitive layer is formed may be any of those which can be used for photosensitive members for electrophotography. Specifically, the conductive substrates may be, for instance, metal drums or sheets made of aluminum, stainless steel or copper, laminates having foils of such metal or deposited layers of such metal. Plastic films, plastic drums, papers, paper tubes, etc. coated with conductive mixtures of conductive materials such as metal powder, carbon black, copper iodide, polyelectrolytes, etc. and proper binders may also be used as the conductive substrates. Further, sheets and drums of conductive plastics containing conductive materials such as metal powder, carbon black and carbon fibers may also be used.

The present invention will be explained in further detail by means of the following Examples. It should be noted that the term "part(s)" used hereunder means "part(s) by weight" unless specifically indicated otherwise.

Reference Example 1

10 g of 4-(N,N-diphenyl)cinnamaldehyde and 7 g of N-amino carbazole were added to 500 ml of methyl alcohol, and 0.5 ml of a 35-% hydrochloric acid aqueous solution was added thereto. The resulting reaction mixture was stirred under reflux in a nitrogen atmosphere for 2 hours. After it is left to cool, precipitated yellow crystal was filtered out to obtain 10 g of a raw product. It was then purified by column chromatography to provide 8 g of pure, yellow powder having a melting point of 173.0°–174.5° C. It was confirmed by elemental analysis, mass spectrometry and infrared spectroscopy that the resulting compound was 4-(N,N-diphenyl)cinnamaldehyde carbazolyl hydrazone having the following formula:

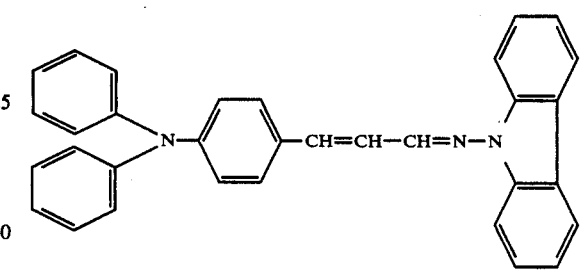

The results of the elemental analysis: As $C_{33}H_{25}N_3$

|  | C | H | N |
| --- | --- | --- | --- |
| Calculated | 85.53% | 5.40% | 9.07% |
| Measured | 85.30% | 5.38% | 9.05% |

The results of the mass spectrometry:
As $C_{33}H_{25}N_3$
Mw = 463
M+ = 463

The infrared spectrum of the above product is shown in FIG. 1.

Reference Example 2

4-(N,N-diphenyl)cinnamaldehyde used in Reference Example 1 was subjected to a known Wittig reaction to form 4-(diphenylamino)phenyl-substituted butadiene having the following formula:

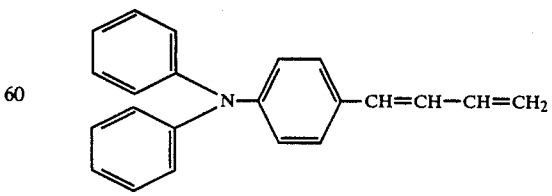

which was then converted, by a known Vilsmeyer reaction, to the corresponding aldehyde having the following formula:

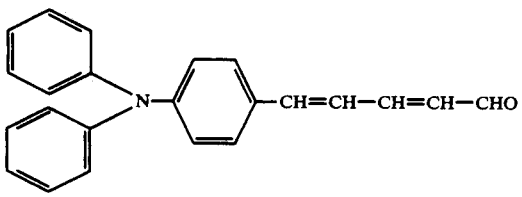

This aldehyde was condensed with N-amino carbazole in the same manner as in Reference Example 1, and the resulting product was purified to provide a pure hydrazone compound (melting point: 184.0°–185.5° C.) represented by the following formula:

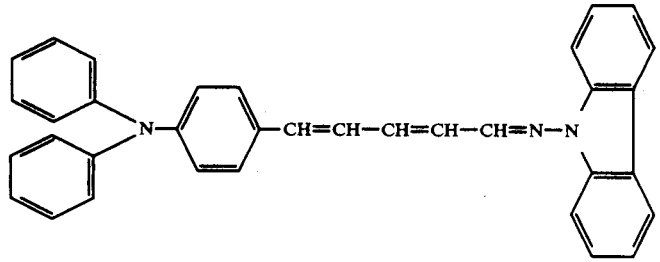

The results of elemental analYsis: As $C_{35}H_{27}N_3$

|  | C | H | N |
|---|---|---|---|
| Calculated | 85.89% | 5.52% | 8.59% |
| Measured | 85.70% | 5.51% | 8.58% |

The results of mass spectrometry:
As $C_{35}H_{27}N_3$
Mw = 489
M+ = 489

Figure 2:
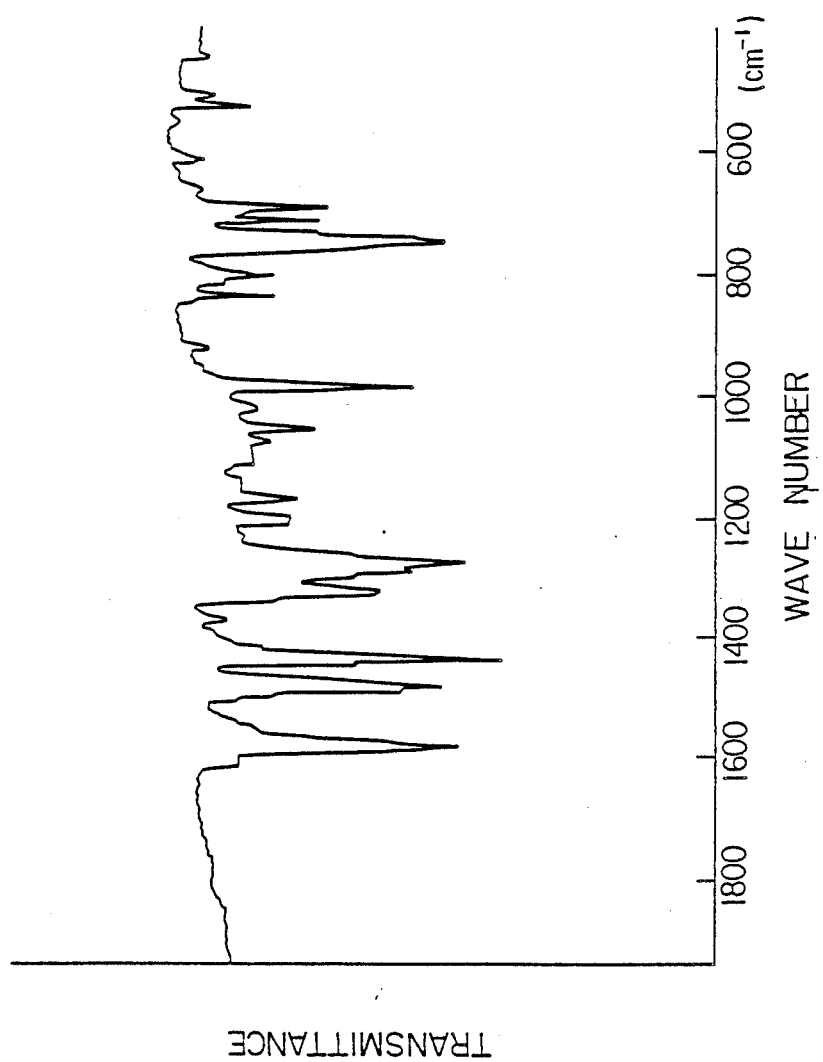
FIG. 2 is a graph showing an infrared spectrum of the hydrazone compound of the present invention synthesized in Reference Example 2.

The infrared spectrum of the above hydrazone compound is shown in FIG. 2.

EXAMPLE 1

1.4 parts of a naphthalic acid-type bisazo pigment having the following formula:

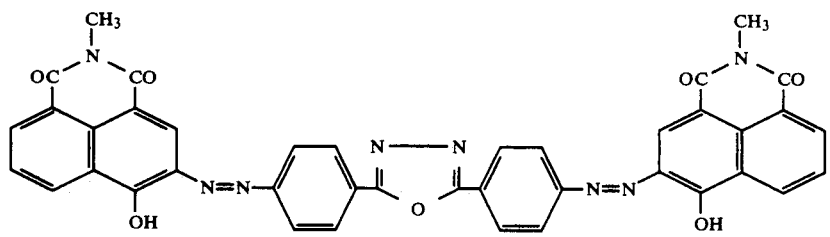

and 2.8 g of polyvinyl butyral (S-LEC B manufactured by Sekisui Chemical Co., Ltd.) were subjected to a dispersion and pulverization treatment by a sand grinder in 100 g of tetrahydrofuran. The resulting dispersion was applied to an aluminum layer vapor-deposited on a 75-μm-thick polyester film by a wire bar in an amount of 0.3 g/m² on a dry weight basis, and then dried to form a charge carrier generating layer.

Applied onto this charge carrier generating layer was a coating solution of 90 parts of the hYdrazone compound prepared in Reference Example 1 and having the following formula:

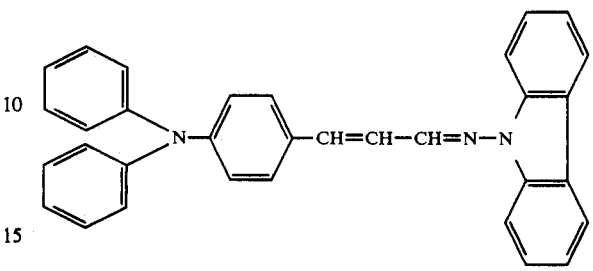

and 100 parts of polycarbonate (NOVAREX 7025 A manufactured by Mitsubishi Chemical Industries Ltd.) in 733 parts of dioxane. The coating layer was dried to form a charge carrier transport layer having a thickness of 13 μm.

The resulting photosensitive member for electrophotography having a photosensitive layer consisting of the above two layers (charge carrier generating layer and charge carrier transport layer) was measured with respect to sensitivity which was expressed by half-decay exposure (E ½). The half-decay exposure was determined by first charging the photosensitive member by corona discharge of −5.2 kV in the dark, and then exposing it to incandescent light of 5 lux to measure the quantity of light exposure necessary for reducing the surface potential of the photosensitive member to one-half the initial surface potential. As a result, the half-decay exposure of this photosensitive member was 2.0 lux.sec.

EXAMPLE 2

A photosensitive member was prepared in the same manner as in Example 1 except for using, instead of the pigment in Example 1, a bisazo pigment represented by the following formula:

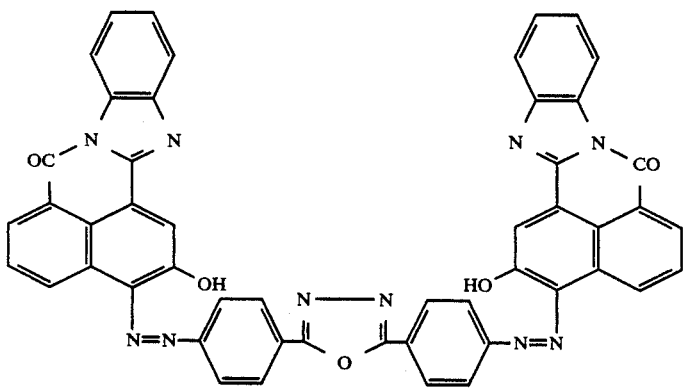

The resulting photosensitive member for electrophotography having a photosensitive layer consisting of the two layers was measured with respect to sensitivity expressed by the half-decay exposure (E ½). As a result, it was 0.96 lux.sec.

Even after 2000 copying with this photosensitive member, the surface potential remained 99% or more of the initial one and the variation of sensitivity was well within the range of measurement errors. This means that this photosensitive member has extremely high durability.

EXAMPLES 3-10

Hydrazone compounds shown in Table 1 below were used in place of the hydrazone compound in Example 1, and the charge carrier generating layers were prepared from the bisazo pigment in Example 2. The resulting photosensitive members for electrophotography were measured with respect to sensitivity expressed by the half-decay exposure (E ½).

The results are shown in Table 1.

TABLE 1

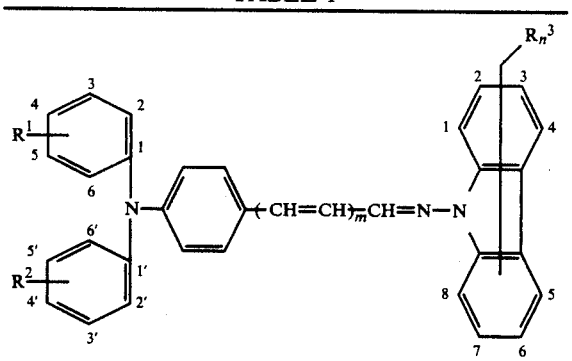

| Example No. | $R^1$ | $R^2$ | $R^3$ | m | n | Sensitivity (lux · sec) |
|---|---|---|---|---|---|---|
| 3 | —H | —H | 3-Cl | 1 | 1 | 2.8 |
| 4 | —H | —H | 3-Br | 2 | 1 | 2.1 |
| 5 | 4-CH$_3$ | —H | —H | 1 | 0 | 1.8 |
| 6 | 4-OCH$_3$ | —H | —H | 1 | 0 | 1.2 |
| 7 | 4-CH$_3$ | 4'-CH$_3$ | —H | 1 | 0 | 0.9 |
| 8 | 4-OCH$_3$ | 4'-OCH$_3$ | —H | 1 | 0 | 1.0 |
| 9 | 4-Cl | —H | —H | 1 | 0 | 2.1 |
| 10 | —H | —H | 3-Br 6-Br | 1 | 2 | 3.5 |

Note: Numbers before the substituents $R^1$, $R^2$ and $R^3$ show their positions.

As described above in great detail, the photosensitive member according to the present invention has not only extremely high sensitivity but also sufficiently low residual potential which causes fogging. Further since it is highly resistant to fatigue, it undergoes little accumulation of residual potential and little variation of surface potential and sensitivity even after the repeated use. In this sense, it has excellent durability.

The present invention has been explained above by Examples, but it should be noted that it is not restricted to them, and that any modifications can be embraced unless they deviate from the scope of the present invention which is defined by the claims attached hereto.

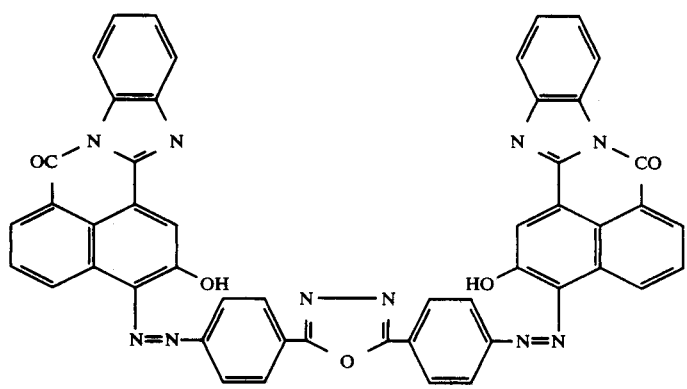

What is claimed is:

1. A photosensitive member for electrophotography having a photosensitive layer composed of (a) a charge carrier transport layer comprising a hydrazone compound represented by the formula (I):

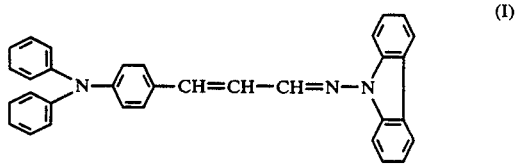

and a binder, and (b) a charge carrier generating layer comprising an azo pigment with or without a binder.

2. The photosensitive member for electrophotography according to claim 1, wherein said photosensitive layer comprises said hydrazone compound, a binder and a sensitizer.

3. The photosensitive member for electrophotography according to claim 1, wherein said sensitizer comprises a dye and/or an electron-attracting compound.

4. The photosensitive member for electrophotography according to claim 1, wherein said photosensitive layer comprises said hydrazone compound, photoconductive particles generating charge carriers with extremely high efficiency upon absorption of light and a binder.

5. The photosensitive member for electrophotography according to claim 1, wherein the azo pigment is a bisazo pigment.

6. The photosensitive member for electrophotography according to claim 5, wherein the azo pigment is represented by the formula: